United States Patent
Thompson (10) Patent No.: US 10,191,673 B2
(45) Date of Patent: Jan. 29, 2019

(54) FORMING OPTICAL DISK SET OF DIFFERENT CAPACITIES FROM FACTORY REJECTED OPTICAL DISKS

(71) Applicant: Spectra Logic Corporation, Boulder, CO (US)

(72) Inventor: Nathan Christopher Thompson, Boulder, CO (US)

(73) Assignee: Spectra Logic Corporation, Boulder, CO (US)

( * ) Notice: Subject to any disclaimer, the term of this patent is extended or adjusted under 35 U.S.C. 154(b) by 228 days.

(21) Appl. No.: 14/970,264

(22) Filed: Dec. 15, 2015

(65) Prior Publication Data

US 2017/0168738 A1 Jun. 15, 2017

(51) Int. Cl.
*G06F 3/06* (2006.01)
*G06F 11/10* (2006.01)

(52) U.S. Cl.
CPC .......... *G06F 3/0619* (2013.01); *G06F 3/0631* (2013.01); *G06F 3/0689* (2013.01); *G06F 11/1092* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,646,923 A * | 7/1997 | Shea | ................ | G11B 20/1883 369/53.17 |
| 5,696,934 A * | 12/1997 | Jacobson | ............ | G06F 3/0601 711/E12.014 |
| 5,845,319 A * | 12/1998 | Yorimitsu | ............ | G06F 3/0626 711/114 |
| 5,875,456 A * | 2/1999 | Stallmo | ................ | G06F 3/0607 711/114 |
| 2002/0171979 A1 * | 11/2002 | Adams | ............... | G11B 20/1217 360/133 |
| 2004/0078376 A1 * | 4/2004 | Kusama | ................ | G06F 11/323 |
| 2004/0148459 A1 * | 7/2004 | Ali | ........................ | G06F 3/0607 711/114 |
| 2007/0136526 A1 * | 6/2007 | Li | ........................ | G06F 3/0605 711/114 |

(Continued)

OTHER PUBLICATIONS

Can different hard disks be used to build a RAID. Article [online]. Adaptec, May 17, 2001 [retrieved on Apr. 19, 2017]. Retrieved from the Internet <http://ask.adaptec.com/app/answers/detail/a_id/2409/~/can-different-hard-disks-be-used-to-build-a-raid%3F>.*

(Continued)

*Primary Examiner* — Ann J Lo
*Assistant Examiner* — Chie Yew
(74) *Attorney, Agent, or Firm* — Kenneth Altshuler (57) ABSTRACT

An optical disk RAID set is described that essentially comprises a plurality of optical recording disks including at least one full capacity disk and a plurality of less than full capacity disks. The full capacity disk possessing a rated storage capacity set by an original manufacturer. The less than full capacity disks, which are generally considered reject disks, do not meet the rated storage capacity due to surface flaws or other manufacturing defects. The less than full capacity disks are reserved for user data. Parity is generated from the user data on the less than full capacity disks. The parity data is stored to the full capacity disk.

18 Claims, 5 Drawing Sheets

(56) References Cited

U.S. PATENT DOCUMENTS

| | | | | |
|---|---|---|---|---|
| 2008/0024772 A1* | 1/2008 | Wang | ................ | G01N 21/4738 |
| | | | | 356/237.2 |
| 2008/0144208 A1* | 6/2008 | Ward | .................. | G11B 21/025 |
| | | | | 360/73.03 |
| 2011/0228468 A1* | 9/2011 | Weng | ..................... | G06F 1/181 |
| | | | | 361/679.33 |
| 2011/0238911 A1* | 9/2011 | Kong | ................. | G06F 11/1076 |
| | | | | 711/114 |
| 2014/0075116 A1* | 3/2014 | Takahashi | ............ | G06F 3/0619 |
| | | | | 711/114 |

OTHER PUBLICATIONS

How RAID-6 dual parity calculation works. Article [online]. Igor Ostrovsky, Oct. 8, 2014 [retrieved on Mar. 7, 2018]. Retrieved from the Internet <https://web.archive.org/web/20141008185530/http://igoro.com/archive/how-raid-6-dual-parity-calculation-works/>.*
Standard RAID levels. Article [online]. Wikipedia, Oct. 23, 2014 [retrieved on Mar. 7, 2018]. Retrieved from the Internet <https://web.archive.org/web/20141028014510/https://en.wikipedia.org/wiki/Standard_RAID_levels>.*

* cited by examiner

FORMING OPTICAL DISK SET OF DIFFERENT CAPACITIES FROM FACTORY REJECTED OPTICAL DISKS

CROSS-REFERENCE TO RELATED APPLICATIONS

None.

FIELD OF THE INVENTION

The present embodiments are directed to a method for constructing parity in an optical disk set having a mixture of disks rated at full capacity and reject disks.

DESCRIPTION OF RELATED ART

Optical disks provide a benefit of long-term data storage without degradation compared with magnetic storage, which can lose data over time due to demagnetization of the magnetic bits. There are a variety of optical disks ranging from compact disks (CD), higher density digital versatile disks (DVD), Blu-ray discs, M-disks, Archived Disks, etc. Generally, optical disks encode binary data, or bits, in the form of pits (0's) and lands (1's). Typically, lasers are used to create pits and lands along a spiral track that can be read by a laser diode, for example, which identifies the pits as 0's due to the lack of reflection when read and the lands as 1's because the lands reflect light when read. Disks are essentially composed of a poly carbonate substrate with various recording layers deposited on the surface. Optical disks can include write-once/read-many storage media, which employ organic dye recording layer between the substrate and a reflective layer, and rewritable discs, which typically contain an alloy a phase change material based recording layer, most often AgInSbTe.

During manufacturing, optical disks are often produced with an absolute storage capacity that exceeds a rated storage capacity. The rated storage capacity is a minimum acceptable storage capacity that a majority of optical disks post manufacturing possess. The rated storage capacity may account for a variety of small defects that subtract from the absolute storage capacity of the optical disks. Disks that fail to meet the minimum acceptable storage capacity, due in general to obvious surface blemishes found during inspection, are considered reject disks and are discarded as trash.

It is to innovations related to this subject matter that the claimed invention is generally directed.

SUMMARY OF THE INVENTION

The present embodiments generally relate to a system and method for constructing parity in an optical disk set having a mixture of disks rated at full capacity and reject disks.

Some embodiments of the present invention contemplate an optical disk magazine comprising: a plurality of optical recording disks including at least one full capacity disk and a plurality of less than full capacity disks, the at least one full capacity disk possessing a minimum storage capacity set by an original manufacturer, the plurality of less than full capacity disks containing user data, the at least one full capacity disk containing parity data of the user data from each of the plurality of less than full capacity disks; and a plurality of slots in a magazine housing, each of the slots containing one of the optical recording disks.

Other embodiments of the present invention contemplate a method comprising: screening a plurality of optical disks for approved disks that meet a minimum acceptable capacity and reject disks that fail to meet the minimum acceptable capacity; generating a set of the optical disks made up of the reject disks and at least one approved disk; storing user data to each of the reject disks from the set; constructing parity data from the user data; and storing the parity data to the at least one approved disk from the set.

And, yet other embodiments of the present invention contemplate a method for generating a RAID set of optical disks, the method comprising: providing a set of optical disks that includes at least one full capacity disk and a plurality of non-full capacity disks, the non-full capacity disks possess lower storage capacity than the at least one full capacity disk; storing user data to each of the non-full capacity disks; constructing parity data from the user data retained on each of the non-full capacity disks; and storing the parity data to the at least one full capacity disk.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of sub-standard storage media with parity to protect against data loss stored on standard storage media. In what follows, similar or identical structures may be identified using identical callouts.

Figure 1:
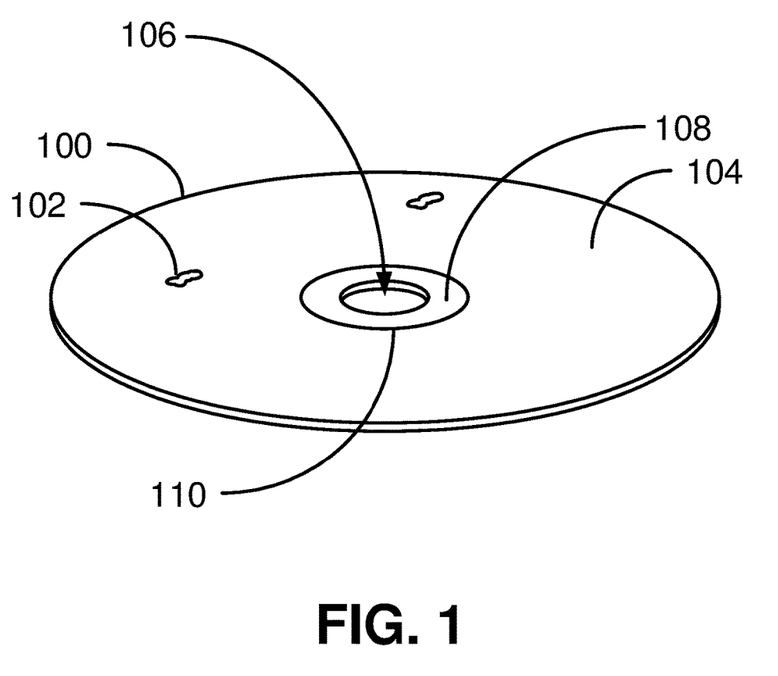
FIG. 1 depicts an embodiment of an optical disk consistent with embodiments of the present invention.

FIG. 1 depicts an embodiment of an optical disk consistent with embodiments of the present invention. In this embodiment, the optical disk 100 possesses a clear poly carbonate substrate 108 with an alloy recording layer 104 that extends over the surface of the optical disk 100 except for an inner ring 110. The optical disk 100 possesses a spindle opening 106 that accommodates a spindle (not shown) in a disk drive (not shown), wherein the disk drive spins the disk 100 about the spindle at speeds typically between 200 and 4,000 RPM. The present embodiment depicts two defects 102 on the surface of the optical disk 100. The defects 102 are cause for rejecting the optical disk 100 as failing inspection.

Certain embodiments described herein are directed to solving a problem of storing data to optical disks 100 that would normally be thrown away as rejects for failing inspection due to an excess of surface defects 102 and creating parity of the data on one or more optical disks that pass inspection. In certain original manufacturing sites, optical disks 100 are visually inspected by an operator. When visual defects 102 (blisters, inconsistent coating, etc.) are found, the operator simply throws the disk 100 away (in the trash). Disks 100 that pass visual inspection may be subject to further inspection/testing or may be considered good enough to meet the minimum acceptable capacity (i.e., the capacity at which the passing optical disks are rated). For example, an optical disk with no defects, whatsoever, may be capable of holding 310 GB of data, but is rated for 300 GB of data. The majority of disks, such as 95% of disks manufactured, might meet the 300 GB minimum acceptable capacity threshold. Accordingly, all 95% of the passing disks will be rated for 300 GB of data. 5% of the discs that fail to pass visual inspection are discarded as rejects. Clearly, a manufacturer or the optical disk industry sets a disk rating/threshold. In some circumstances, an excess of 99% of disks manufactured meet a minimum acceptable threshold and other circumstances less than 90% of disk manufactured meet a minimum acceptable threshold.

Figure 2A:
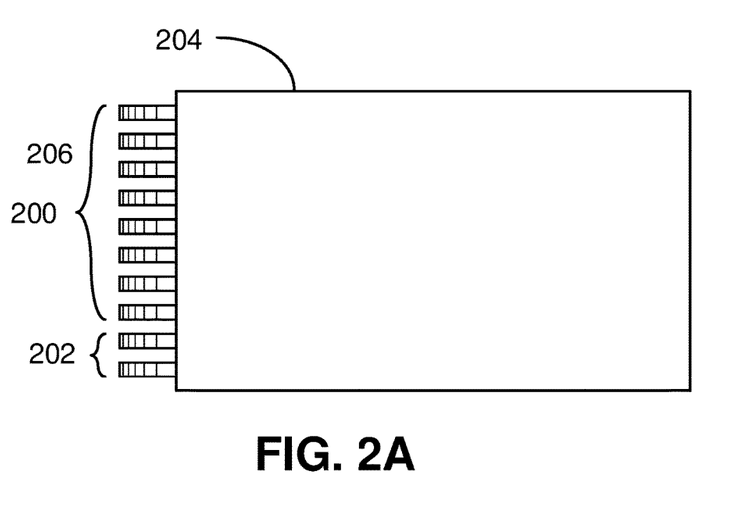
FIGS. 2A and 2B illustratively depict an embodiment of a disk magazine constructed in accordance with various embodiments of the present invention.
Figure 2B:
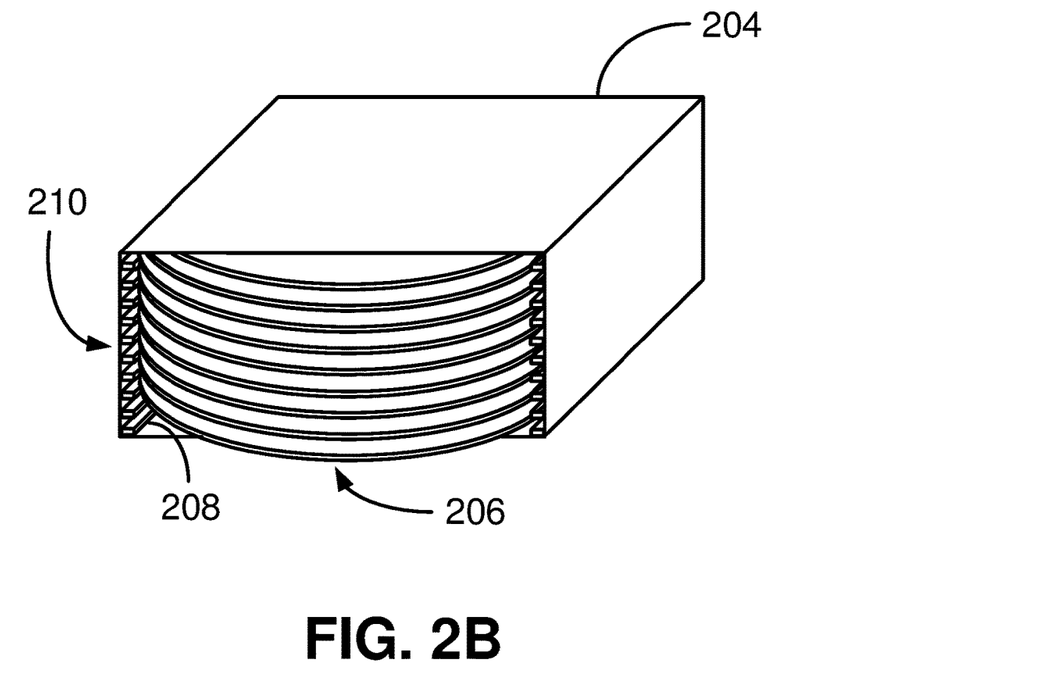

FIGS. 2A and 2B depict an optical disk magazine accommodating ten optical disks consistent with embodiments of the present invention. Here, there are two full capacity optical disks 202 that pass inspection and/or meet a minimum acceptable capacity threshold (set by the manufacturer or the industry, for example), and eight less than full capacity optical disks 200 that fail to pass inspection or meet the minimum acceptable capacity threshold. As discussed above, the less than full capacity optical disks 200 are often reject disks due to flaws or blemishes 102 of the recording material 104 on the surface of the optical disk 100. The eight reject optical disks 200 and the two passing optical disks 202 complete a disk set 206. The disk set 206 is shown disposed in a disk magazine 204. The disk magazine 204 possesses a plurality of slots 208 that support each individual disk 100. In this embodiment, the disk magazine 204 provides an open face 210 through which optical disks 100 can be inserted or removed from the disk magazine 204.

There is a potential danger of using reject optical disks 200 with flaws 102 for data storage because data residing on reject optical disks 200 may become corrupt due to a defect 102 growing or lost altogether if a reject optical disk 200 is inadvertently destroyed. Certain failsafe techniques, such as use of Redundant Array of Independent Disks (RAIDs), can be employed using one or more parity disks 202 to complete a designated set of optical disks 206. A parity disk 202 can be used to rebuild a missing or damaged disk 200 from the set 206. Thus, if data is lost on any one of the optical disks 200 in the disk set 206, the data can be recovered using the parity disk 202 along with the remaining optical disks 200. Fundamentally, if the first data bit of user data from a first optical disk is a "1", the first data bit of user data from a second optical disk is a "0", and the first data bit of user data from a third optical disk is a "1", then the parity bit would be a "0". If, for example, the first data bit from the second optical disk was lost, the first data bit from the second optical disk can be reconstructed from the parity bit by calculating the first bits of the first optical disk and the third optical disk equaling the parity optical disk, or 1+?+1=0. From this simple equation, the "?" (corresponding to the first bit of the second optical disk) must be a "0". By aligning user data bits from a plurality of optical disks 200, parity of the user data from each disk 200 can be constructed on a parity disk 202.

Figure 3A:
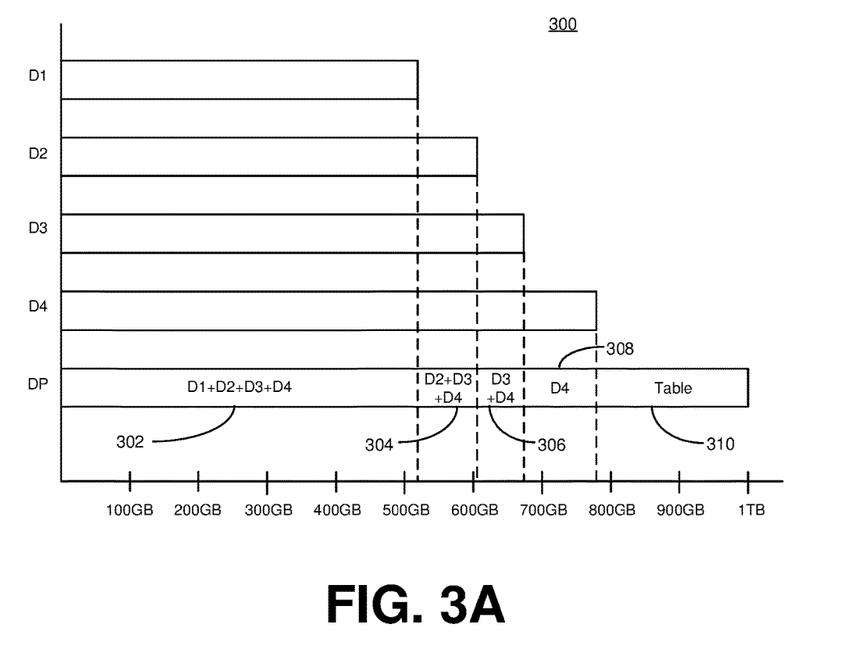
FIG. 3A illustratively depicts a bar chart for constructing parity constructed in accordance with certain embodiments of the present invention.
Figure 3B:
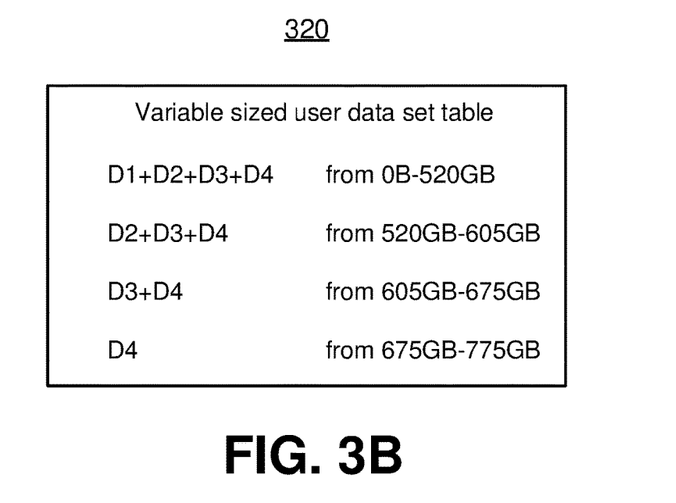
FIG. 3B illustratively depicts a variable sized user data set table constructed in accordance with certain embodiments of the present invention.

FIG. 3A illustratively shows a bar graph 300 with aligned variable sized user data sets arranged to generate parity data consistent with embodiments of the present invention. Graph 300 illustratively shows a first optical disk D1 possessing 520 GB of user data, a second optical disk D2 possessing 605 GB of user data, a third optical disk D3 possessing 675 GB of user data, the fourth optical disk D4 possessing 775 GB of user data, and the parity disk DP having a rated capacity of 1 TB and possessing parity data of the user data from D1-D4. As shown, the parity disk DP possesses parity data from D1-D4 302 (from 0 to 520 GB of data), D2-D4 (from 520 GB to 605 GB of data), D3-D4 (from 605 GB to 675 GB of data), and D4 (from 635 GB to 775 GB of data). There is also reserved space 310 on the parity disk DP for a variable sized user data set table 320. An embodiment of the variable sized user data set table 320 is depicted in FIG. 3B consistent with embodiments of the present invention. The table 320 can be used to map parity data. For example, parity data for D1-D4 302 goes up to 520 GB of data, D2-D4 is from 520 GB to 605 GB, D3-D4 is from 605 GB to 675 GB, and just D4 is from 635 GB to 775 GB. In this way lost data can be regenerated, depending on which reject disk 200 is damaged or lost, by subtracting data retained on the remaining reject disks 200 from the parity disk DP 202. The variable sized user data set table 320 can be used as a map directing which disk/s generated the specific parity data during the lost data reconstruction. Certain embodiments contemplate the reject disks D1-D4 are viewed by an end user as being a composite data storage capacity, which in this case is 2575 GB.

Certain embodiments contemplate writing header information on each of the reject disks 200 indicating how much user data can be stored to each of the reject disks 200. While, other embodiments contemplate writing header information on each of the reject disks 200 indicating how much user data is actually stored on each of the reject disks 200. Certain embodiments contemplate using the header information on each of the reject disks to assemble the variable size user data set table 320 on the parity disk DP 202.

Figure 4:
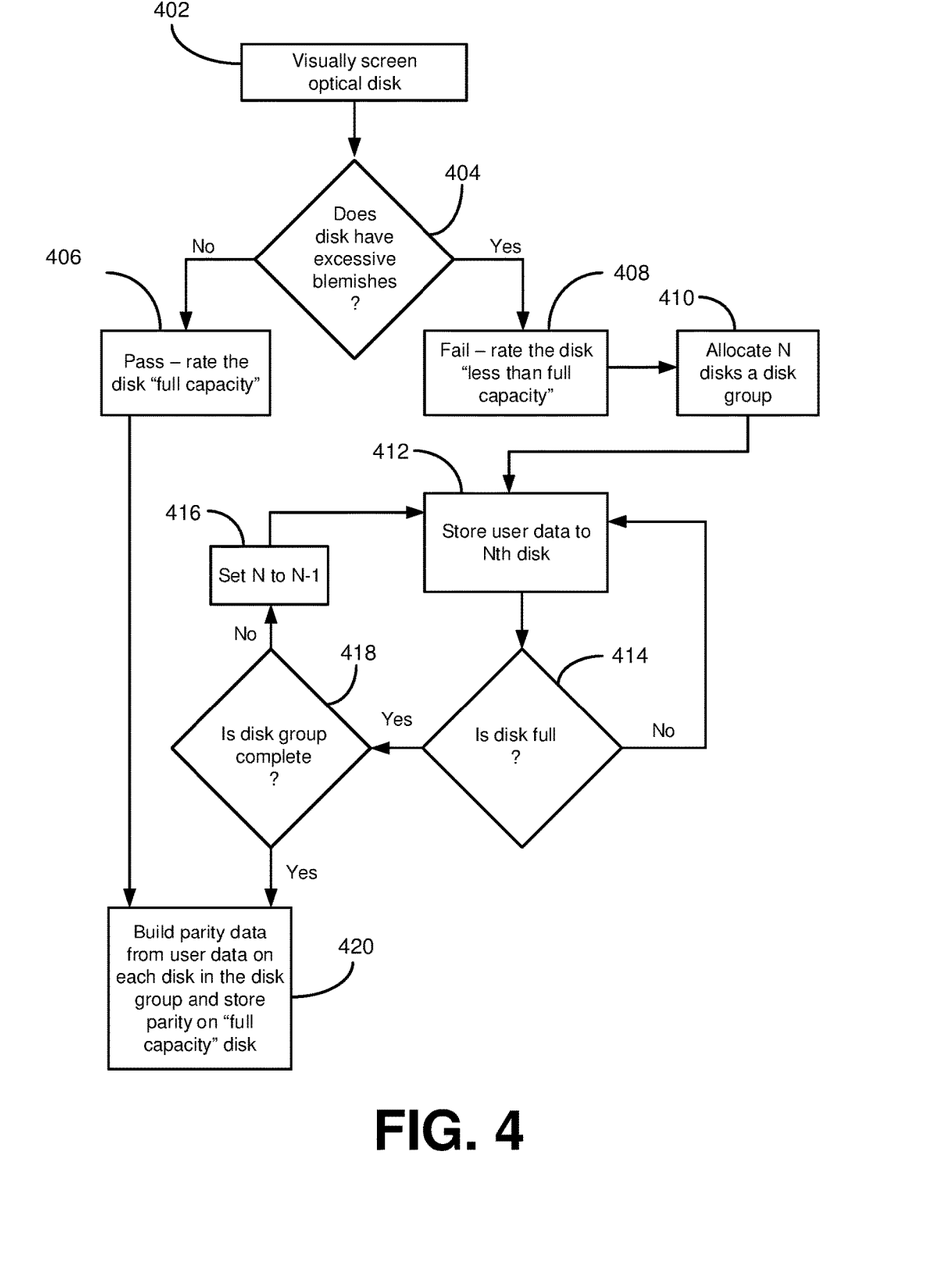
FIG. 4 is an embodiment of a block diagram of method steps for building parity, which can be used in conjunction with FIG. 3A consistent with embodiments of the present invention.

FIG. 4 is an embodiment of a block diagram of method steps for building parity, which can be used in conjunction with FIG. 3A consistent with embodiments of the present invention. In the method step 402, optical disks 100 are visually screened to identify blemishes or flaws 102 on the disks 100. Screening can be done at an Original Equipment Manufacturer (OEM) by an operator or via machine vision technology, for example. Step 404 is a decision step whereby if one of the disks 100 (during screening) is found to have excessive blemishes or flaws 102 the disk 100 is assigned in the fail category, i.e., a reject disk 200, for having a capacity rate less than what is considered rated as full capacity, step 408. One embodiment contemplates an optical disk 100 having a storage capacity rate of less than 98% of the full capacity assigned to the reject or fail category. If the disk 100 (during screening) is found to be essentially free of blemishes or flaws 102 the disk 100 is assigned in the passing category, i.e., a passing disk 202, for having a capacity rate that is at least what is considered rated as full capacity, step 406.

With reference to block 408, from the optical disks 200 that are rated as "less than full capacity", N reject disks are allocated to a group, step 410. For illustrative purposes, let N be five reject disks 200. This group of five reject disks 200 can have varied data capacities, in one embodiment, or identical data capacities that are less than "full capacity" in another embodiment. Other embodiments contemplate a mixture of reject disks 200 and disks that meet capacity ratings 202. In the embodiment that the five reject disks 200 have varied data capacities, a first reject disk 200 of the group of five reject disks 200 is engaged with a disk drive (not shown) whereby user data is stored to the first disk 200, step 412. User data is considered data sent by a user, or host, of the system that includes the disks 100 and disk drive/s (not shown). The system, in one embodiment, is envisioned to be an optical disk library comprising a plurality of disk drives and hundreds, if not thousands, of optical disks connected to a server. One embodiment contemplates data being stored to the first reject optical disk 200 until it is full and then storing header information on the first reject optical disk 200 indicating how much data is retained on the disk. Another optional embodiment contemplates scanning the first reject optical disk 200 and estimated how much data space is available and record the estimation in header information on the first reject optical disk 200.

The next step is a decision step 414 that questions whether the first reject disk 200 is essentially full and cannot store more data. If the first reject disks 200 is not full then store more data to the first reject disk 200 as shown by the arrow going back to block 412. Otherwise, if the first reject disk 200 is full, proceed to step 418. Certain embodiments contemplate the first reject disk 200 not necessarily being filled with user data to capacity, but for some reason or another is considered done storing user data, hence proceed to step 418. Header information indicating the final amount of data stored to the first reject disk 200 can be retained on the disk 200. Optionally, information regarding how much data is stored to the first reject disk 200 can be retained in some other storage device cooperating with the system storing data to the first reject disk 200. Step 418 is a decision step attempting to determine if storing user data to all of the reject disks 200 from the disk group is essentially done. In the present example where there are five disks in the disk group, the answer is no, proceed to step 416 where the next reject disk 200 from the disk group is recruited to store data, as shown by the arrow directing to step 412.

With reference back to the decision block 418, when all five disks are essentially done being used to store data, proceed to step 422 build parity data. In this embodiment, parity data from the user data stored to the five reject disks 200 are stored to a passing "full capacity" disk 202, block 420. Certain embodiments contemplate buffering the user data from the five reject disks in a higher capacity storage device, such as to one or more disk drives or solid-state drives, for example. Other embodiments contemplate building parity from the user data that is stored to each of the five reject disks to a higher capacity storage device while the user data is essentially being stored to the disks. In other words, the user data sent to the first reject disk can be combined with the second reject disk to build parity of the user data on the first and second reject disks. User data being sent to a third reject disk can then be added to the parity of the first and second reject disk user data to create parity data of the user data from the first, second and third reject disks 200. In this way, the completed parity data can be dumped (sent) to the full capacity disk 202. Clearly, there are many options to generate parity data from the five reject disks that would be readily apparent to a skilled artisan having read the present disclosure. Once the parity disk 202 and the group of five reject disks 200 are complete, that makes a set 206 that can be disposed in a disk magazine 204. Certain embodiments contemplate a disk magazine 204 containing ten optical disks that consist of two disk sets 206. Other embodiments contemplate a disk magazine 204 containing ten optical disks that consist of one disks set 206 with one, or optionally, two parity disks 202 as depicted in FIG. 2A.

Embodiments of the present invention can be commercially practiced in an optical disk magazine library. Certain embodiments envision an optical disk magazine library possessing an enclosure housing multiple optical disk drives and a shelf system retaining a plurality of optical disk magazines. The optical disk magazine library is further envisioned to possess a hard disk drive system or solid-state drive system that can buffer user data, generate parity and fulfill a variety of other commands and activities within the optical disk magazine library. Other embodiments envision an archive storage system and controller, such as Spectra Logic's Black Pearl manufactured in Boulder, Colo. The archive controller and storage system is an object based storage system that possesses a plurality of hard disk drives and/or solid-state drives and interfaces with a host system on one end and the optical disk magazine library on the other end. The archive controller storage system receives user data and intelligently transfers the user data to the optical disk magazine library whereby user data is stored to flawed optical disks that possess less than full storage capacity and parity stored on full capacity disks that RAIDs the user data stored on the flawed optical disks. Certain embodiments contemplate the archive controller storage system constructing parity of user data in the archive controller and storage system.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, variable capacity optical disks can range from a small fraction to just shy of the storage capacity of a full capacity rated optical disk while still maintaining substantially the same functionality without departing from the scope and spirit of the present invention. Another example can include developing an optional table or pointer scheme, different than the embodiment described, that identifies the variable capacity optical disks which comprise a disk set envisioned using hard disk drives, solid state drives, or other, or a combination of hard disk drives, solid state drives while still maintaining substantially the same functionality without departing from the scope and spirit of the present invention. Also, the terms "one" is synonymous with "a", which may be a first of a plurality. Moreover, elements described herein as a first element (optical disk or optical disk drive, for example) and second element is descriptive to mean a plurality of elements. Additionally, though there are five optical disks including a parity optical disk used herein for example, it is contemplated that a variety of different numbers of optical disks can comprise a disk set and a variety of other data striping techniques can be used with a set of optical disks without departing from the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. An optical disk magazine comprising:
    a plurality of optical recording disks including at least one full capacity disk and a plurality of less than full capacity disks, the at least one full capacity disk possessing a minimum storage capacity set by an original manufacturer, the plurality of less than full capacity disks do not meet the minimum storage capacity and did not meet the minimum storage capacity prior to being comprised in the optical disk magazine, the plurality of less than full capacity disks containing user data, the at least one full capacity disk containing parity data of the user data from each of the plurality of less than full capacity disks; and a plurality of slots in a housing, each of the slots containing one of the optical recording disks.

2. The optical disk magazine of claim 1 wherein the full capacity disk and the plurality of less than the full capacity disks comprise a disk set.

3. The optical disk magazine of claim 2 wherein a lowest storage capacity disk from the plurality of less than the full capacity disks sets an operational storage capacity that is the same for all of the plurality of less than the full capacity disks.

4. The optical disk magazine of claim 1 wherein the plurality of less than full capacity disks possess a storage capacity that is less than 98% of the full capacity disk.

5. The optical disk magazine of claim 1 wherein the plurality of less than full capacity disks were rejected from the original manufacturer due to flaws.

6. The optical disk magazine of claim 5 wherein the flaws include at least one of a scratch, a blisters, a blemish.

7. The optical disk magazine of claim 2 wherein the plurality of less than full capacity disks are of different storage capacities ranging from a lowest storage capacity disk to a highest storage capacity, the parity data comprises aligned and added user data from the plurality of less than full capacity disks, the at least one full capacity disk further possesses information indicating from where the parity data is generated.

8. A method comprising:
   screening a plurality of optical disks for approved disks that meet a minimum acceptable capacity and reject disks that fail to meet the minimum acceptable capacity prior to storing any user data to either of the approved disks and reject disks;
   after the screening step, generating a set of the optical disks made up of the reject disks and at least one of the approved disks;
   storing the user data to each of the reject disks from the set;
   constructing parity data from the user data; and
   storing the parity data to the at least one approved disk from the set.

9. The method of claim 8 further comprising disposing the set of the optical disks in a disk magazine.

10. The method of claim 8 further comprising establishing a first disk of the reject disks possesses less user data than a second disk of the reject disks which possesses less user data than a third disk of the reject disks; creating a table on the approved disk indicating how much of the user data is contained on each of the first disk, the second disk and the third disk of the reject disks.

11. The method of claim 8 further comprising establishing a first disk of the reject disks possesses less user data than a second disk of the reject disks which possesses less user data than a third disk of the reject disks; storing the user data to all of the reject disks at a lowest capacity consistent with the first disk.

12. The method of claim 8 wherein the minimum acceptable capacity is 97% of maximum theoretical capacity of a disk with no defects, wherein the disk is one of the approved disks.

13. The method of claim 8 further providing a composite data storage capacity of the reject disks in the set to an end user.

14. The method of claim 8 wherein the plurality of optical disks are all of different storage capacities and the set is a RAID set.

15. A method for generating a RAID set of optical disks, the method comprising:
   providing a set of optical disks that includes at least one full capacity disk and a plurality of non-full capacity disks, the at least one full capacity disk possessing a minimum storage capacity set by an original manufacturer, the plurality of non-full capacity disks do not meet the minimum storage capacity and did not meet the minimum storage capacity prior to being comprised in the set of optical disks;
   after providing said set of optical disks storing the user data to each of the non-full capacity disks;
   constructing parity data from the user data retained on each of the non-full capacity disks; and
   storing the parity data to the at least one full capacity disk.

16. The method of claim 15 wherein the non-full capacity disks possess a storage capacity that is less than 98% of the full capacity disks.

17. The method of claim 15 further comprising establishing a first disk of the non-full capacity disks possesses less space for the user data than a second disk of the non-full capacity disks which possesses less space for the user data than a third disk of the non-full capacity disks; generating a table on the full capacity disk indicating how much user data is contained on each of the first disk, the second disk and the third disk of the non-full capacity disks.

18. The method of claim 15 further comprising providing a disk magazine adapted to accommodate no more than the set of optical disks.

* * * * *